June 19, 1945.  R. D. AGNEW  2,378,526
WELL SURVEYING INSTRUMENT
Filed April 8, 1942
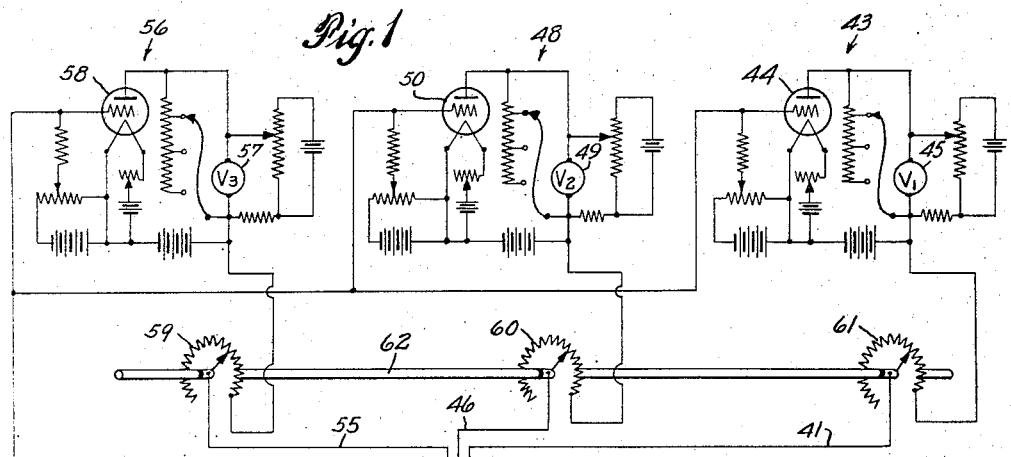
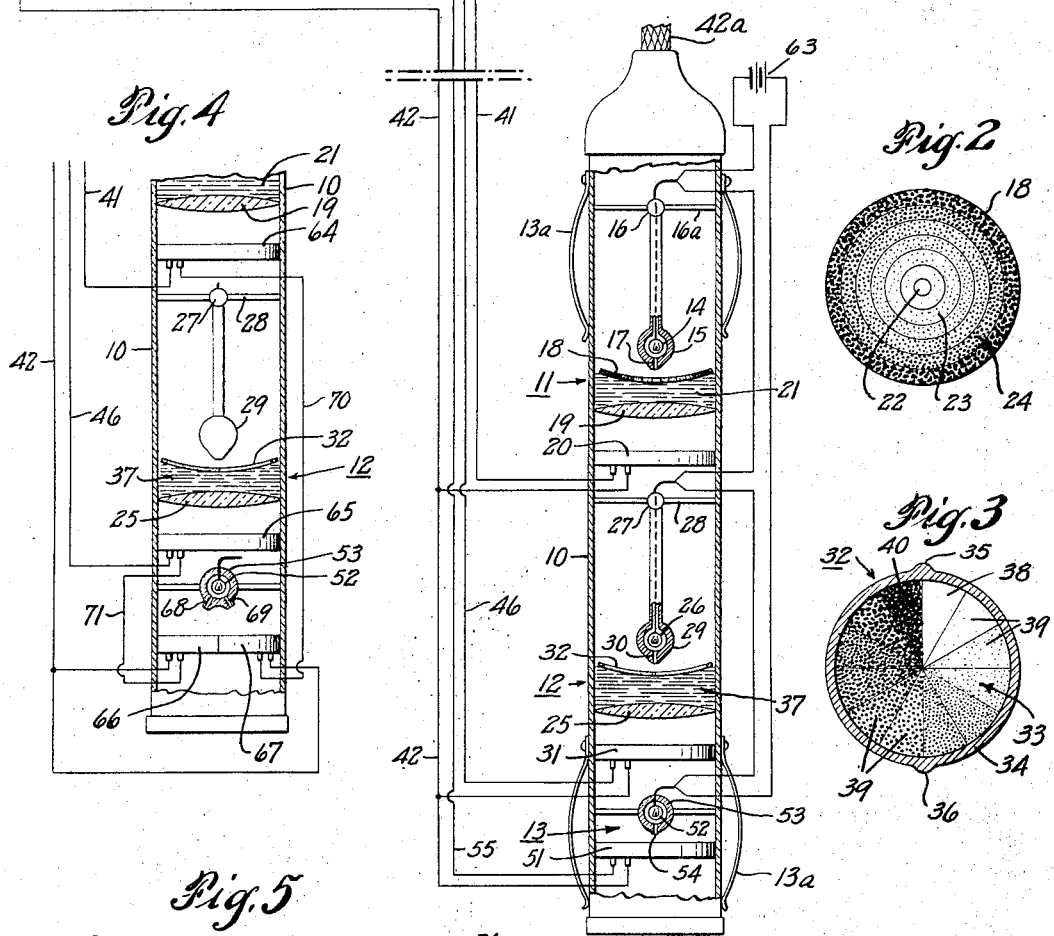
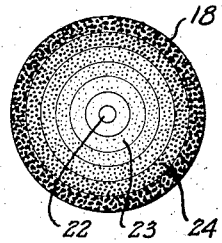
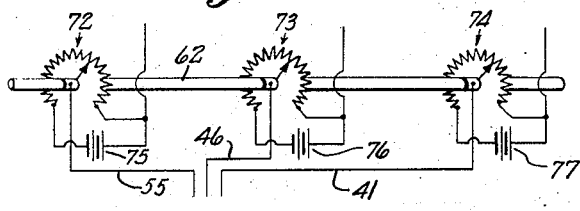
INVENTOR:
Robert D. Agnew
BY
Noguet, Neary & Campbell
ATTORNEYS Patented June 19, 1945

2,378,526

UNITED STATES PATENT OFFICE 2,378,526

WELL SURVEYING INSTRUMENT

Robert D. Agnew, Coalinga, Calif., assignor to Schlumberger Well Surveying Corporation, Houston, Tex., a corporation of Delaware Application April 8, 1942, Serial No. 438,160

2 Claims. (Cl. 33—205)

This invention relates to bore hole surveying, and more particularly to a novel method and means for continuously obtaining indications of the inclination of a bore hole from the vertical and of the azimuthal direction of such inclination with respect to a chosen direction of reference.

In the prior art methods for surveying bore holes, it is customary to ascertain the deviation and direction of the deviation at selected depths throughout the length of the bore hole. Determinations are generally made at regular intervals of from 50 to 250 feet and the course of the hole plotted therefrom, on the assumption that the course of the hole at each of the selected stations is representative of the course of the section in the vicinity of the particular station in each case. Obviously, determinations could be made very close together, for example every 10 feet, but the cost and time consumed are prohibitive, so that this is seldom, if ever, done.

Most of the instruments used for this purpose are so constructed that no control can be exercised from the surface of the earth, except for varying the depth of the instrument in the bore hole. In many cases, the instrument is totally enclosed within a casing lowered into the bore hole, and a clockworks or timing mechanism is employed for causing records to be made after predetermined intervals of time have elapsed. During the interval of time between records, the apparatus is moved from one station to the next, a portion of the interval being utilized to permit the apparatus to come to rest prior to the taking of a record.

Apparatus of this type has not been found entirely satisfactory because if anything prevents the surveying instrument from being positioned at the desired depth by the end of each interval, the desired record will not be produced. Moreover, the instrument will make a record at the end of each interval even though it is not at a desired station. Hence, a record must be kept of the depth of the apparatus in the bore hole at the start of a run and at the end of each interval of time thereafter, in order that the erroneously taken records can be discarded and proper depths assigned to the usable ones. Further, no estimate of the deviation can be made until the survey has been completed, the equipment withdrawn from the bore hole and the record removed.

Accordingly, it is an object of this invention to provide a new and improved well surveying method and apparatus in which control may be exercised from the surface of the earth.

It is also an object of this invention to provide a novel method and apparatus of the above character in which a continuous record of the deviation of the bore hole and of the direction of such deviation are obtained whereby any assumptions as to the course of the hole between selected stations may be eliminated.

A further object of the invention is to provide a novel method and apparatus for continuously recording the deviation measurements at the surface of the earth whereby the operator may constantly observe the measurements as the survey proceeds.

Another object of the invention is to provide apparatus for recording the deviation measurements automatically on a continuous record strip as a function of depth in the bore hole, thereby avoiding the necessity for subsequently assigning depths to the records.

An object of the invention is to provide deviation measuring apparatus in which no photographic film is lowered into the bore hole.

A still further object of the invention is to provide bore hole surveying apparatus utilizing photosensitive means for providing indications of the variables to be investigated.

Another object of the invention is to provide photosensitive bore hole surveying means in which the accuracy of the measurements is not affected by temperature changes in the vicinity of the apparatus.

Inasmuch as bore hole surveying and electrical logging operations are related and are frequently made successively, another object of this invention is to provide bore hole surveying apparatus of the above character in which the deviation measurements may be recorded by the same recorder that is used for electrical logging.

Additional objects and features of the invention will become apparent from the following detailed description, taken in connection with the accompanying drawing, in which:

Figure 1 is a schematic diagram illustrating bore hole surveying apparatus constructed according to the invention;

Figure 2 is a plan view of an element of the deviation measuring portion of the apparatus shown in Figure 1;

Figure 3 is a view in plan of an element of the orientation determining portion of the apparatus shown in Figure 1;

Figure 4 illustrates schematically a modified form of the apparatus; and

Figure 5 is a schematic diagram of a modified circuit for compensating for the effects of temperature variations upon the photosensitive devices used in the apparatus.

In accordance with the invention, the intensity of radiant energy impinging upon two photosensitive devices disposed in the bore hole is modified in accordance with the angular deviation of the bore hole axis from the vertical and the azimuthal direction of that deviation from a chosen reference direction, respectively. The outputs from the photosensitive devices are transmitted to the surface of the earth where they are preferably continuously and simultaneously recorded as the apparatus passes through the bore hole.

Inasmuch as the responses of the photosensitive devices may vary with temperature, means is provided in accordance with the invention for compensating for such changes in response as may be produced by temperature variations in the bore hole.

Referring now to Figure 1, the well surveying apparatus comprises a water tight casing 10 within which is mounted deviation determining apparatus 11, orientation determining apparatus 12 and apparatus 13 for compensating for the effects produced by temperature variations in the bore hole. Mounted on the casing 10 are a plurality of conventional type springs 13a which serve to maintain the axis of the casing 10 in fixed relation to the axis of the bore hole.

The deviation determining apparatus 11 comprises a source of radiant energy 14 disposed within an enclosure 15 which is freely suspended from a ball joint 16, for example, mounted in a rigid transverse member 16a in the casing 10. The enclosure 15 is provided with a small, narrow slot 17 from which a beam of radiant energy is directed through a lens 19 to a photosensitive device 20 which may be a conventional type photoelectric cell, for example.

In the path of the beam from the slot 17 in the enclosure 15 is disposed a screen 18, preferably formed in the shape of a segment of a sphere, which is designed to modify the intensity of the beam in accordance with the inclination of the axis of the casing 10 with respect to the vertical as will be described in greater detail hereinafter. The screen 18 may be secured rigidly within the casing 10 or it may be floated on a transparent liquid 21 such as alcohol, for example, contained within the casing 10 above the lens 19 as shown in Figure 1.

As shown in greater detail in Figure 2, the screen 18 is provided with a plurality of concentric zones of varying transparency. For example, the innermost zone 22 may be entirely transparent and the different zones 23 and 24, etc., located at greater radial distances from the center of the screen 18 may be made less and less transparent. Instead of providing concentric zones of different transparency, the screen 18 may be shaded in a uniformly increasing manner from center to edge. A suitable screen may be made by exposing photographic film for different periods of time in such a manner as to produce the type of screen desired.

It will be noted that whenever the axis of the bore hole deviates from the vertical, the source of radiant energy 14 will deviate in corresponding fashion from the axis of the casing 10. As a result, the beam of radiation from the slot 17 therein will be intercepted by zones of decreasing transparency on the screen 18 so that the intensity of the light impinging upon the photoelectric cell 20 will decrease as the inclination increases. In accordance with the invention, the width of each of the zones 22, 23, 24, etc., is made sufficiently small so that the responses from the photoelectric cell 20 can be calibrated in terms of inclination from the vertical with a reasonable degree of accuracy. For example, the widths of these zones may be chosen so that the beam will pass from one zone to the adjacent zone for a half degree change in inclination of the bore hole.

The orientation determining apparatus comprises a second source of radiant energy 26 also suspended from a ball joint 27 mounted in a transverse member 28 secured within the casing 10. The source of radiant energy 26 is mounted in an enclosure 29 having a small, narrow slot 30 therein from which a beam of radiant energy may be directed through a lens 25 to a photosensitive device 31 such as a photoelectric cell, for example, also mounted within the casing 10. Mounted in the casing 10 in the path of the beam of radiant energy is a screen 32, preferably formed in the shape of a segment of a sphere, which serves to modify the intensity of the beam of light from the source 26 in accordance with the orientation of the casing 10 in the bore hole.

To this end, the screen 32 comprises (Fig. 3) a central transparent portion 33 mounted in a ring 34 preferably made of ferro-magnetic material such as iron, for example, and having diametrically opposed projections 35 and 36 formed thereon. The ring 34 is preferably magnetized such that the projections 35 and 36 form the south and north poles respectively of a permanent magnet, for example, and it may be pivotally mounted within the casing 10 or floated on a body of liquid 37 as shown in Figure 1 so that it is capable of rotation about the axis of the casing 10.

As shown in greater detail in Figure 3, the central transparent portion 33 of the disc 32 is divided into a plurality of segments 38, 39, etc. These segments have varying degrees of transparency such that, for example, the segment 38 is entirely transparent, while the adjacent segment 40 is substantially opaque, the intervening segments decreasing in transparency by substantially equal amounts.

Inasmuch as the projection 35 on the disc 34 will always be directed toward the magnetic north pole, it will be readily apparent that, for different dierctions of the inclination of the bore hole, radiant energy from the source 26 will be directed through different segments of the transparent portion 33 of the disc 32. If the disc is constructed as shown in Figure 3, an increase in the angle between the direction of the inclination and the magnetic north pole will cause a decrease in the intensity of the light impinging upon the photoelectric cell 31, so that the response of the photoelectric cell 31 can be calibrated in terms of the direction of the inclination with respect to the magnetic north pole.

The output from the photoelectric cell 20 is transmitted through the conductors 41 and 42 in the supporting cable 42a to a conventional type vacuum tube volt meter 43 located at the surface of the earth. The circuit of the volt meter 43 is well known in the art and it will not be described in detail. It includes a vacuum tube 44, in the plate circuit of which is included a potential measuring device 45, preferably of the recording type, which records a function of the intensity of radiation impinging upon the photoelectric cell 20.

In similar fashion, the output of the photoelectric cell 31 is transmitted through the conductors 46 and 42 to a second conventional type vacuum tube volt meter 48 also located at the surface of the earth. The recording type potential indicating device 49 in the plate circuit of the vacuum tube 50 of the vacuum tube volt meter 48 provides a record of a function of the intensity of the radiation impinging upon the photoelectric cell 31.

As indicated above, the temperature in a bore hole increases with depth and the responses of photoelectric cells are a function of temperature so that errors may be introduced in the readings obtained with the apparatus described above when used in deep bore holes. In order to compensate for any variations that may be produced by temperature effects, a third photosensitive device 51, preferably a photoelectric cell, is also mounted within the casing 10 and it receives radiant energy from a suitable source 52 mounted in an enclosure 53 provided with a narrow slot 54 therein. The output of the photoelectric cell 51 is transmitted through the conductors 55 and 42 to a third conventional type vacuum tube volt meter 56 also located at the surface of the earth which is provided with a potential indicating instrument 57 in the plate circuit of the vacuum tube 58. The readings of the potential indicating instrument 57 are a function of the intensity of the radiation impinging upon the photoelectric cell 51.

Mounted in series with the conductors 55, 46 and 41 are three variable resistors 59, 60 and 61 which are secured to a common shaft 62 in order that they may be adjusted simultaneously. It will be apparent that by adjusting the resistors 59, 60 and 61, the magnitudes of the signals applied to the vacuum tube volt meters 56, 43 and 48, respectively, can be increased or decreased as desired.

So long as the characteristics of the photoelectric cell 51 remain unchanged, no change will be observed in the reading of the potential indicating instrument 57. However, if the response of the photoelectric cell 51 changes appreciably because of an increase in the bore hole temperature, a corresponding change will be observed in the reading of the potential indicating instrument 57. In order to compensate for this, the resistors 59, 60 and 61 are adjusted manually until the reading of the potential indicating instrument 57 is restored to its original value. It is assumed that the error produced by temperature variations will be the same for all three photoelectric cells 51, 31 and 20 and since the three resistors 59, 60 and 61 are adjusted by the same amount in each circuit, it is further assumed that when the reading of the potential indicating instrument 57 is brought to its original value, the proper compensation has been made in the vacuum tube volt meter circuits 43 and 48.

In order that the compensatory circuit described above may function effectively, the photoelectric cells 51, 31 and 20 should preferably have similar characteristics. The resistors 59, 60 and 61 should also be substantially identical and the vacuum tube volt meters 56, 43 and 48 should have substantially the same electrical characteristics.

Furthermore, the radiation emitted by the sources 14, 26 and 52 should be substantially constant. For this reason, it is desirable to have the three sources 14, 26 and 52 connected to the same source of electrical energy which may be a battery 63, for example, disposed within the casing 10 in the bore hole. The sources of radiant energy 14, 26 and 52 may be connected either in series or in parallel although the series connection is preferred since if one source fails the others also fail providing an indication at the surface of the earth that the apparatus is not functioning properly.

Compensation for errors introduced by temperature variations may also be accomplished by using photovoltaic cells as shown in Figure 4. Referring to this figure, conventional type photovoltaic cells 64 and 65 are substituted for the photoelectric cells 20 and 31 and a pair of similar photovoltaic cells 66 and 67 are substituted for the photoelectric cell 51. In this modification, radiant energy is directed from the source 52 to each of the photovoltaic cells 66 and 67 and the enclosure 53 is provided with two spaced apart slots 68 and 69 for this purpose.

One terminal of the photovoltaic cell 64 is connected to the conductor 41 and its other terminal is connected through a conductor 70 to one terminal of the photovoltaic cell 67, the other terminal of which is connected to the common return 42 such that the photovoltaic cells 64 and 67 are connected in series opposition. In similar fashion, one terminal of the photovoltaic cell 65 is connected to the conductor 46 and its other terminal is connected through a conductor 71 to one terminal of the photovoltaic cell 66 the other terminal of which is connected to the common return 42 such that the photovoltaic cells 65 and 66 are also connected in series opposition.

If the cells 64 and 67 have substantially identical characteristics, it will be readily apparent that any changes in response that may be produced by temperature variations will be equal and opposite in the two cells and will cancel out so that the only effective response from the cell 64 will be that produced by the radiation emanating from the source 14. Similarly, if the cells 65 and 66 have substantially identical characteristics, any changes in response caused by temperature variations will cancel out so that the only effective response from the cell 65 will be a function of the radiant energy emanating from the source 26.

It will be noted that the adjustment of the variable resistances 59, 60 and 61 in Figure 1 alters the sensitivities of the vacuum tube volt meters 56, 48 and 43. If it is not desirable to do this, the circuits shown in Figure 5 may be employed. As shown in this figure, a plurality of substantially identical potentiometers 72, 73 and 74, with corresponding sources of electrical energy 75, 76 and 77 are substituted for the variable resistors 59, 60 and 61. By adjusting the potentiometers 72, 73 and 74, the voltages applied to the vacuum tube volt meters 56, 48, and 43, respectively, may be increased or decreased without altering their sensitivities.

Further modifications may be made in the specific circuits and apparatuses described above, as will be apparent to those skilled in the art. For example, the common return 42 may be eliminated by using the earth as a ground. Also, other measuring apparatus might be substituted for the vacuum tube volt meters 56, 43 and 48, and light integrating spheres might be used in place of the lenses 19 and 25.

The invention thus provides a new and improved method for determining the inclination from the vertical of a bore hole drilled into the earth and the azimuthal direction of the inclination with respect to a predetermined reference direction. By modifying the intensity of radiation impinging upon photosensitive devices, and simultaneously recording the responses of the photosensitive devices, variations in the inclination and the direction of the inclination may be obtained continuously during a single run into a bore hole so that the desired information may be obtained more rapidly than has been possible heretofore.

While several specific embodiments have been described above, the invention is not intended to be limited thereto but those embodiments are susceptible of numerous changes in form and detail within the scope of the following claims.

I claim:

1. In apparatus for determining the inclination of a bore hole, the combination of a casing adapted to be lowered into a bore hole with its axis maintained in fixed relation to the axis of the bore hole, photosensitive means mounted in the casing, a pendulum swingably mounted in the casing above said photosensitive means, means in said pendulum for directing a beam of radiant energy axially of said pendulum from its lower end to said photosensitive means, and a member mounted between said pendulum and said photosensitive means for modifying the intensity of the beam in accordance with the inclination of the bore hole, said member having one degree of transparency in the central portion thereof and different degrees of transparency at zones concentric with, and spaced at different radial distances from, said central portion.

2. In apparatus for determining the inclination of a bore hole, the combination of a casing adapted to be lowered into a bore hole with its axis maintained in fixed relation to the axis of the bore hole, photosensitive means mounted in the casing, a pendulum swingably mounted in the casing above said photosensitive means, means in said pendulum for directing a beam of radiant energy axially of and from the lower end of said pendulum to said photosensitive means, and a member mounted between said pendulum and said photosensitive means for modifying the intensity of the beams, said member being substantially transparent at its midportion and decreasing in transparency radially outward in all directions from said midportion to form concentric zones of differing transparency.

ROBERT D. AGNEW.